(12) United States Patent
Feinstein

(10) Patent No.: US 9,677,828 B2
(45) Date of Patent: Jun. 13, 2017

(54) ENGINEERED PACKING FOR HEAT EXCHANGE AND SYSTEMS AND METHODS CONSTRUCTING THE SAME

(71) Applicant: ZoneFlow Reactor Technologies, LLC, Windsor, CT (US)

(72) Inventor: Jonathan Jay Feinstein, North Salem, NY (US)

(73) Assignee: ZONEFLOW REACTOR TECHNOLOGIES, LLP, Windsor, CT (US)

( * ) Notice: Subject to any disclaimer, the term of this patent is extended or adjusted under 35 U.S.C. 154(b) by 154 days.

(21) Appl. No.: 14/297,210

(22) Filed: Jun. 5, 2014

(65) Prior Publication Data

US 2015/0354908 A1    Dec. 10, 2015

(51) Int. Cl.
*F28F 13/12*    (2006.01)
*B01J 19/24*    (2006.01)
(Continued)

(52) U.S. Cl.
CPC ............... *F28F 13/12* (2013.01); *B01J 19/24* (2013.01); *B01J 19/2415* (2013.01); *B01J 19/32* (2013.01); *F28F 13/02* (2013.01); *B01J 2219/00094* (2013.01); *B01J 2219/00099* (2013.01); *B01J 2219/3221* (2013.01);
(Continued)

(58) Field of Classification Search
CPC .. F28F 13/12; F28F 13/02; F28F 3/083; B01J 19/24
USPC .. 165/109.1, DIG. 487, DIG. 503, 146, 147; 422/174, 180; 72/379.2
See application file for complete search history.

(56) References Cited

U.S. PATENT DOCUMENTS 3,311,163 A *  3/1967  Owen ................... F28D 1/0233
                                                       165/128
4,340,501 A    7/1982  Davidson
(Continued)

FOREIGN PATENT DOCUMENTS

JP      2006-038304 A      2/2006
WO    WO-2013/058267 A1   4/2013

OTHER PUBLICATIONS

International Search Report issued by the Patent Cooperation Treaty for International Application No. PCT/US15/33760 dated Aug. 19, 2015 (3 pages).

(Continued)

*Primary Examiner* — Jianying Atkisson
*Assistant Examiner* — Raheena Rehman
(74) *Attorney, Agent, or Firm* — Robert P. Michal, Esq.; Carter, DeLuca, Farrell & Schmidt, LLP

(57) ABSTRACT

An apparatus includes an inlet, an outlet, and a sheet disposed proximate a heat transfer surface, wherein the sheet is oriented in a sheet plane that is displaced from a plane of the heat transfer surface by an angle of at least 10 degrees. The apparatus also includes a plurality of tabs attached to the sheet, the tabs lying in respective tab planes, wherein the tab planes and the sheet plane intersect forming respective intersections. The intersections of the tab planes and the sheet plane are substantially parallel. The intersections of the tab planes and the sheet plane are at an angle of less than 88° to the heat transfer surface, and the plurality of tabs collectively form channels directing a fluid passing from the inlet to the outlet to impinge the heat transfer surface.

10 Claims, 3 Drawing Sheets

(51) Int. Cl.
*F28F 13/02* (2006.01)
*B01J 19/32* (2006.01)

(52) U.S. Cl.
CPC *B01J 2219/3281* (2013.01); *B01J 2219/3288* (2013.01); *B01J 2219/32206* (2013.01); *B01J 2219/32213* (2013.01); *B01J 2219/32231* (2013.01); *B01J 2219/32234* (2013.01); *B01J 2219/32241* (2013.01); *B01J 2219/32408* (2013.01); *B01J 2219/32466* (2013.01); *B01J 2219/32475* (2013.01)

(56) References Cited

U.S. PATENT DOCUMENTS

| | | | | |
|---|---|---|---|---|
| 4,347,897 A * | 9/1982 | Sumitomo | ............. | F28F 3/083 159/28.6 |
| 4,715,437 A * | 12/1987 | Tanaka | ............. | F28F 1/325 165/151 |
| 5,184,672 A * | 2/1993 | Aoki | ............. | F28F 3/027 138/38 |
| 5,301,747 A * | 4/1994 | Daschmann | ............. | F28D 9/0037 165/166 |
| 5,469,817 A * | 11/1995 | Hoag | ............. | F02F 1/14 123/41.79 |
| 5,643,484 A * | 7/1997 | Swars | ............. | A41D 31/0016 219/552 |
| 6,534,022 B1 * | 3/2003 | Carlborg | ............. | B01D 53/8631 422/171 |
| 6,712,128 B1 * | 3/2004 | Dussinger | ............. | H01L 23/4093 165/182 |
| 6,820,682 B2 * | 11/2004 | Hayashi | ............. | B60H 1/025 165/109.1 |
| 7,147,047 B2 * | 12/2006 | Wolk | ............. | F28D 1/05383 165/152 |
| 7,337,831 B2 * | 3/2008 | Torii | ............. | F28F 1/32 165/109.1 |
| 7,566,487 B2 | 7/2009 | Feinstein | | |
| 7,578,339 B2 * | 8/2009 | Kaga | ............. | F28F 1/325 165/109.1 |
| 7,913,750 B2 * | 3/2011 | Huang | ............. | F28D 1/0391 165/109.1 |
| 7,976,783 B2 | 7/2011 | Feinstein | | |
| 8,047,272 B2 | 11/2011 | Whittenberger et al. | | |
| 8,257,658 B2 | 9/2012 | Feinstein | | |
| 2006/0016582 A1 * | 1/2006 | Hashimoto | ............. | F28D 7/1684 165/109.1 |
| 2006/0169019 A1 | 8/2006 | Kutscher et al. | | |
| 2007/0012430 A1 * | 1/2007 | Duke | ............. | F28F 3/027 165/109.1 |
| 2009/0014159 A1 * | 1/2009 | Nishino | ............. | F28F 13/12 165/109.1 |
| 2014/0238006 A1 | 8/2014 | Iwasaki | | |

OTHER PUBLICATIONS

Written Opinion of the International Searching Authority, International Application No. PCT/US15/33760 dated Aug. 4, 2015 (5 pages).
Official Action issued by the Canadian Intellectual Property Office in relation to Canadian Application No. 2,950,383 dated Dec. 13, 2016 (7 pages).
Notice of Submission of Opinion (Office Action) issued by the Korean Intellectual Property Office in relation to Korean Patent Application No. 10-2016-7034291 dated Jan. 18, 2017 (6 pages) along with English language translation (4 pages).

* cited by examiner

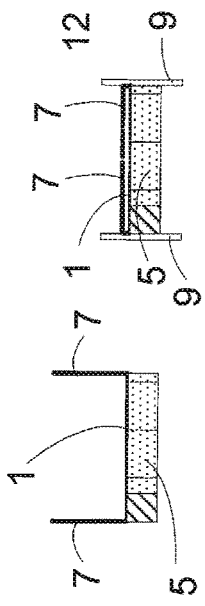
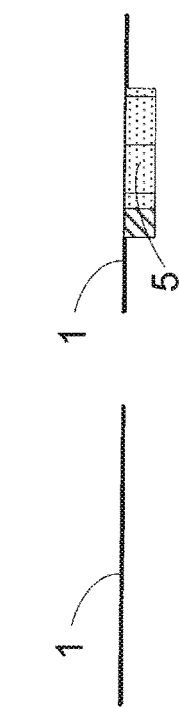
Fig. 1A
Fig. 2A
Fig. 3A
Fig. 4A
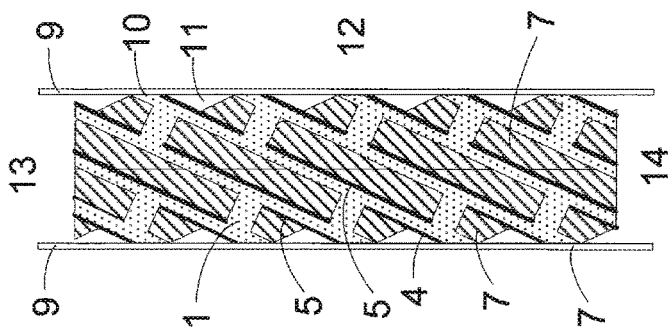
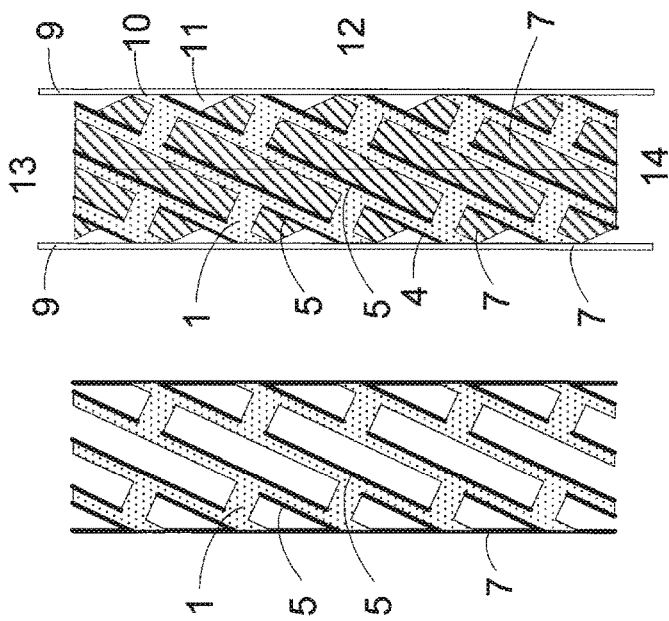
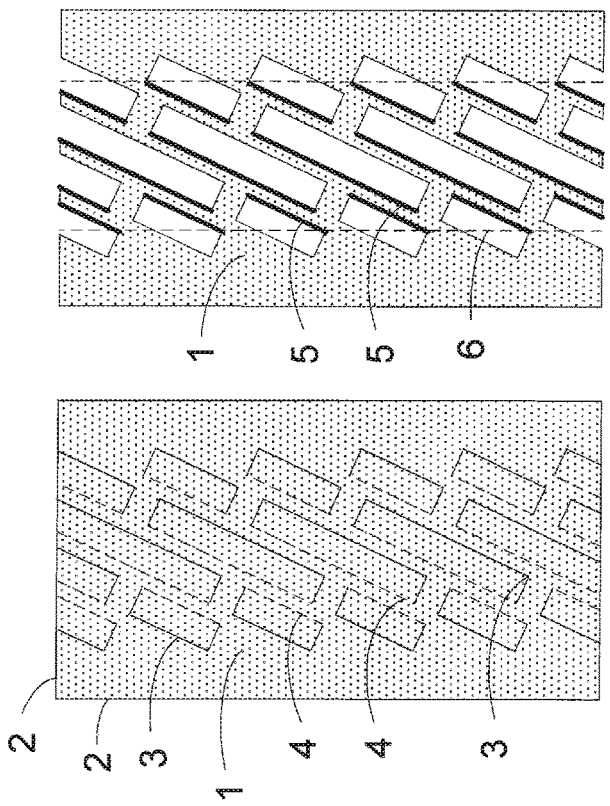
Fig. 1B
Fig. 2B
Fig. 3B
Fig. 4B

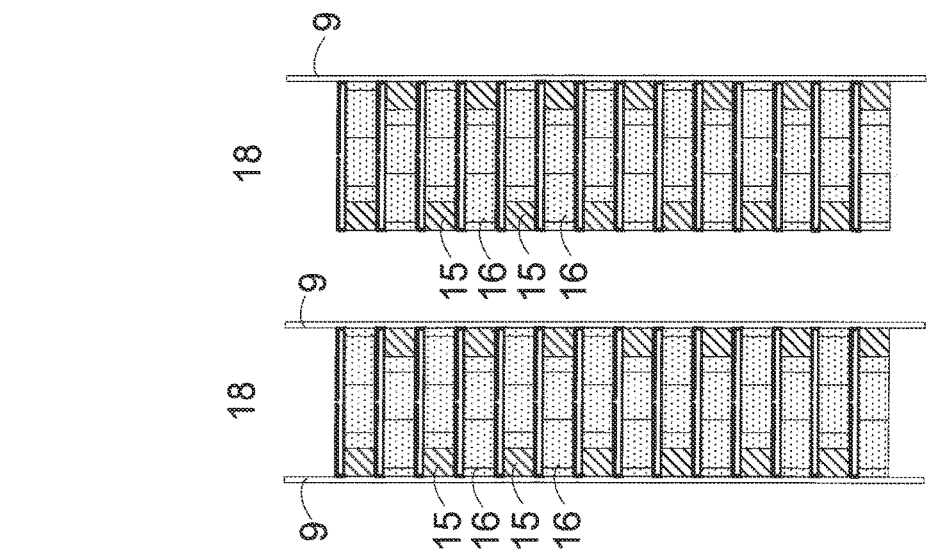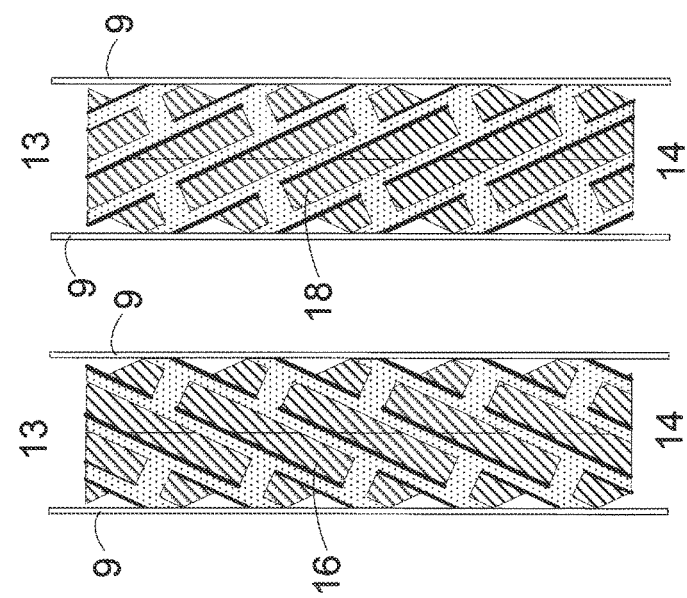

ENGINEERED PACKING FOR HEAT EXCHANGE AND SYSTEMS AND METHODS CONSTRUCTING THE SAME

FIELD OF INVENTION

The present invention relates generally to heat exchangers and non-adiabatic catalytic reactors, and more particularly to engineered packing for heat exchange and systems and methods for constructing the same.

BACKGROUND

Various systems and methods to improve heat transfer between a heat transfer surface and a fluid via an engineered packing that directs the fluid to impinge the surface and thereby break down boundary layers that otherwise impede heat transfer are known. For example, apparatus employing this technique include those taught in U.S. Pat. Nos. 7,566,487, 7,976,783, and 8,257,658. These three patents disclose engineered packing structures that provide advantageous flow patterns created by flow channels that convey a fluid to and from a heat transfer surface at an oblique angle to the surface, which surface is approximately parallel to the general path of the fluid from an inlet to an outlet of a heat exchange device such as for heat transfer inside a tube or annulus or between flat plates.

Generally, the ratio of heat transfer coefficient or the Nusselt number ($N_u$) to pressure drop ($\Delta P$) in a heat exchanger declines as $N_u$ increases due to increased velocity. The above-listed patents utilize flow impingement to create high ratios of $N_u/\Delta P$ at relatively high values of $N_u$ compared to other heat exchangers. These patents permit effective heat transfer between two or more fluids with less primary heat transfer surface area, permitting less expensive heat transfer devices.

Extended surfaces are also known as in plate and fin heat exchangers, but are only generally useful where the thermal conductivity of the extended surface material far exceeds the conductivity of the fluid transferring heat to or from the secondary surface as is the case with extended surfaces composed of copper, aluminum or noble metals and in the transfer of heat to or from a gas. Aluminum plate and fin heat exchangers enable the construction of compact and inexpensive heat exchangers for noncorrosive fluids at temperatures generally below 200° C., particularly for gases. Extended surfaces are less beneficial where the extended surfaces must be composed of carbon steel, stainless steel, nickel alloys, or other materials of relatively low thermal conductivity for corrosive or high temperature applications.

SUMMARY

Using computational fluid dynamic simulation and finite element analysis of stresses, a new design has been devised and is disclosed herein to provide advantageous flow patterns in a structure that is easier and less expensive to manufacture than the known art for creating desirably high ratios of $N_u/\Delta P$ at high values of $N_u$.

It is an object of the present invention to provide apparatus with a high ratio of $N_u/\Delta P$ at high values of $N_u$ which can be manufactured in less time and on less expensive machine tools using less expensive dies with improved service life. It is another object of the present invention to create such apparatus or substrates with greater geometric surface area (GSA). Increased GSA is useful for promoting chemical reactions in the presence of a catalyst mounted on the GSA of a substrate. Other objects of the present invention will be observed in the reading of this disclosure.

In accordance with an embodiment of the present invention, an apparatus providing enhanced heat transfer is provided. The apparatus includes an inlet, an outlet, and a sheet disposed proximate a heat transfer surface, wherein the sheet is oriented in a sheet plane that is displaced from a plane of the heat transfer surface by an angle of at least 10 degrees. The apparatus also includes a plurality of tabs attached to the sheet. The tabs being in respective tab planes, wherein the tab planes and the sheet plane intersect to form respective intersections. The intersections of the tab planes and the sheet plane are substantially parallel. The intersections of the tab planes and the sheet plane are at an angle of less than 88° to the heat transfer surface, and the plurality of tabs collectively form channels directing a fluid passing from the inlet to the outlet to impinge the heat transfer surface.

In one embodiment, the tabs are attached only to the sheet.

In another embodiment, the plurality of tabs may be formed by blanking and folding defined portions from the sheet.

In another embodiment, the sheet planes are substantially perpendicular to the heat transfer surface.

In another embodiment, the tab planes are substantially parallel to each other.

In another embodiment, angles between the intersections and the heat transfer surface are less than 70°.

In another embodiment, the heat transfer surface is at least one of a tube wall and a plate.

In another embodiment, at least one of the sheet and the plurality of tabs is coated with a catalyst.

In another embodiment, the apparatus includes a steam methane reformer.

In another embodiment, the apparatus further includes a second multiplicity of second tabs attached to a second sheet wherein the second tabs collectively form channels directing a fluid passing from the inlet to the outlet to flow away from the heat transfer surface. One or more gaps lie between at least parts of the second sheet and the heat transfer surface.

In accordance with another embodiment, an apparatus includes an inlet, an outlet, and a plurality of sheets disposed proximate a heat transfer surface, wherein each of the plurality of sheets is oriented in a respective sheet plane that is displaced from a plane of the heat transfer surface by an angle of at least 10 degrees. The apparatus also includes a plurality of tabs attached to the plurality of sheets. The tabs being in respective tab planes, wherein each respective tab planes and a corresponding sheet plane intersect forming respective intersections. The intersections of the tab planes and the corresponding sheet plane are substantially parallel, and the intersections of the tab planes and the corresponding sheet plane are at an angle of less than 88° to the heat transfer surface. The plurality of tabs collectively form channels directing a fluid passing from the inlet to the outlet to impinge the heat transfer surface.

In one embodiment, the tabs are attached only to the sheets.

In another embodiment, the plurality of tabs may be formed by blanking and folding defined portions from the sheets.

In another embodiment, the sheet planes are substantially perpendicular to the heat transfer surface.

In another embodiment, the tab planes are substantially parallel to each other.

In another embodiment, angles between the intersections and the heat transfer surface are less than 70°.

In another embodiment, the heat transfer surface is at least one of a tube wall and a plate.

In another embodiment, at least one of the plurality of sheets and the plurality of tabs is coated with a catalyst.

In another embodiment, the apparatus includes a steam methane reformer.

These and other advantages of the present disclosure will be apparent to those of ordinary skill in the art by reference to the following Detailed Description and the accompanying drawings.

BRIEF DESCRIPTION OF THE DRAWINGS

FIG. 1A illustrates a sheet viewed from the inlet in accordance with an embodiment;

FIG. 1B shows the sheet of FIG. 1A viewed from one face of the sheet in accordance with an embodiment;

FIG. 2A illustrates a sheet viewed from the inlet in accordance with an embodiment;

FIG. 2B shows the sheet of FIG. 2A viewed from one face of the sheet in accordance with an embodiment;

FIG. 3A illustrates a sheet viewed from the inlet in accordance with an embodiment;

FIG. 3B shows the sheet of FIG. 3A viewed from one face of the sheet in accordance with an embodiment;

FIG. 4A illustrates a sheet viewed from the inlet in accordance with an embodiment;

FIG. 4B shows the sheet of FIG. 4A viewed from one face of the sheet in accordance with an embodiment;

FIG. 5A shows a fully formed sheet viewed from the inlet in accordance with an embodiment;

FIG. 5B shows the sheet of FIG. 5A viewed from one face of the sheet in accordance with an embodiment;

FIG. 6A shows a mirror image sheet of the sheet of FIGS. 5A-5B viewed from the sheet's inlet in accordance with an embodiment;

FIG. 6B one face of the sheet of FIG. 6A in accordance with an embodiment;

FIG. 7 shows an apparatus comprising multiple sheets as viewed from the inlet in accordance with an embodiment;

FIG. 8 shows an apparatus comprising multiple sheets as viewed from the inlet in accordance with another embodiment;

DETAILED DESCRIPTION OF THE INVENTION

Figure 9A:
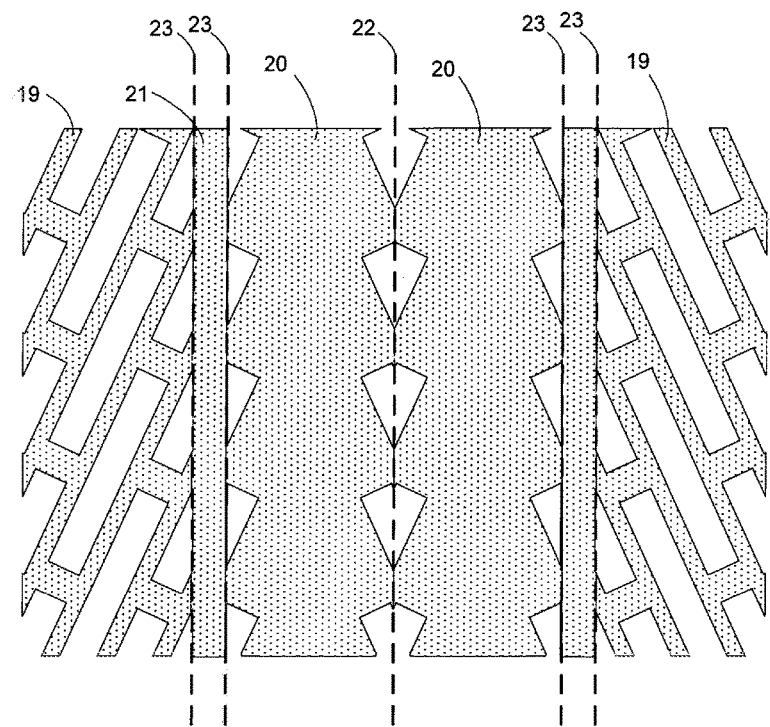
FIG. 9A shows a sheet at one stage of forming as viewed from one face of the sheet in accordance with an embodiment.

The following detailed description discloses various exemplary embodiments and features of the invention. These exemplary embodiments and features are not meant to be limiting.

Certain of the Figures are illustrated in pairs (e.g., FIGS. 1A and 1B). In each pair, the figure labelled as 'A' is a view of a sheet from a top edge. The figure labelled 13' is a view from one face of the sheet. The upper face of a sheet is shown as a dotted area, the back side of a sheet is shown as a cross hatched areas, and the edges of a sheet are shown as thick solid lines.

Referring now to FIGS. 1A-1B, sheet 1 having edges 2 is cut or blanked along solid lines 3. Dashed lines 4 show where the sheet is folded to form tabs, as shown in FIGS. 2A-2B. Lines 4 constitute intersections of the sheet and the formed tabs. Referring to FIGS. 2A-2B, portions of the sheet of FIGS. 1A-1B are folded 90° upward, forming tabs 5. Dashed lines 6 show where the sheet is folded to produce the form shown in FIGS. 3A-3B. Referring to FIGS. 3A-3B, the sheet is folded 90° below the plane of the sheet to form wall sections 7. Referring to FIGS. 4A-4B, sections 7 of the sheets of FIGS. 3A-3B are shown to be folded an additional 90° or a total of 180° around the back of the sheet. The formed sheet is shown to be placed between heat transfer surfaces or walls 9, which are perpendicular to the sheet shown in FIGS. 4A-4B and are seen from their edges. The newly formed lateral extremities or new edges 10 of the formed sheet abut surfaces 9, and gaps 11 lie intermittently between the formed sheet and the surfaces. Apparatus 12 includes the formed sheet with its tabs, intersections, edges and gaps, heat transfer surfaces 9, inlet 13, and outlet 14. Fluid passes from the inlet to the outlet through the apparatus. It is not necessary for the formed sheets to be joined to or touch the surfaces, but the formed sheets are preferably as close to the surfaces as possible and most preferably abut the surfaces. The formed sheets may be welded, brazed, soldered, glued, or otherwise joined or bonded to the surfaces. The fold lines 4 of the tabs constitute intersections between the sheet and the tabs in the apparatus and are substantially parallel to each other. The tabs are preferably folded through the same fold angle of 90°. The tabs constitute channel walls to direct the flow of a fluid toward the left surface (as perceived by a person viewing FIGS. 4A-4B) as fluid flows through apparatus 12 from the inlet 13 to the outlet 14.

In one embodiment, the sheet is oriented in a sheet plane that is displaced from the plane of the heat transfer surface by an angle of at least 10 degrees. The sheet plane may be substantially perpendicular to the heat transfer surface. The heat transfer surface may be, for example, a tube wall, a plate, etc. The sheet and/or the tabs may be coated with a catalyst. In another embodiment, the angles between the intersections and the heat transfer surface are less than 70°. In another embodiment, the angles between the intersections and the heat transfer surface are less than 45°. In another embodiment, the angles between the intersections and the heat transfer surface are less than 70° and greater than zero degrees. In another embodiment, the angles between the intersections and the heat transfer surface are less than 45° and greater than zero degrees. In another embodiment, the intersections of the tab planes and the sheet plane are at an angle of less than 88 degrees to the heat transfer surface. In another embodiment, the intersections of the tab planes and the sheet plane are at an angle to the heat transfer surface of less than 88 degrees and greater than zero degrees.

FIG. 5A and FIG. 5B are two respective views of the formed sheet of FIGS. 4A-4B, where sheet 15 is the formed sheet viewed from the inlet as in FIG. 4A, and FIG. 5B is a lateral view of the formed sheet corresponding to the view in FIG. 4B. Left and right heat transfer walls 9 are shown. Referring to FIG. 6A, a second formed sheet 16 corresponding to sheet 15 of FIG. 5A is shown, and FIG. 6B is a view of the second sheet corresponding to the view of FIG. 5B where the formed sheet of FIG. 6B is the mirror image left to right of the formed sheet of FIG. 5B. The structures of FIGS. 5A-5B and 6A-6B have inlets 13 and outlets 14. The formed sheets of FIGS. 5A-5B and 6A-6B are bounded by left and right heat transfer surfaces 9. Whereas the formed sheet of FIGS. 5A-5B causes fluid flowing through the structure from the inlet to the outlet to impinge, or impact, left surface 9 and flow away from right surface 9, the formed sheet of FIGS. 6A-6B causes fluid to impinge, or impact, right surface 9 and flow away from left surface 9.

Referring to FIGS. 7 and 8, the structures 15 and 16 of formed sheets in FIGS. 5A-5B and 6A-6B, respectively, are inserted in alternating sequence between left and right surfaces 9 in FIG. 7 and next to a single surface 9 in FIG. 8. The surfaces 9 may be straight as shown or curved as viewed from the respective inlets, such that the volume between the surfaces in FIG. 7 would constitute an annulus and the volume to the left of the surface in FIG. 8 would constitute part of the interior of a tube or of the exterior of a tube. The tabs may be cut from their respective sheets in a tapered fashion and the respective formed sheets may be closer together at an inside diameter of a tube or annulus than at an outside diameter of the tube or annulus. The assembled formed sheets, inlet, outlet and at least one heat transfer surface constitute engineered packings 18.

Figure 9B:
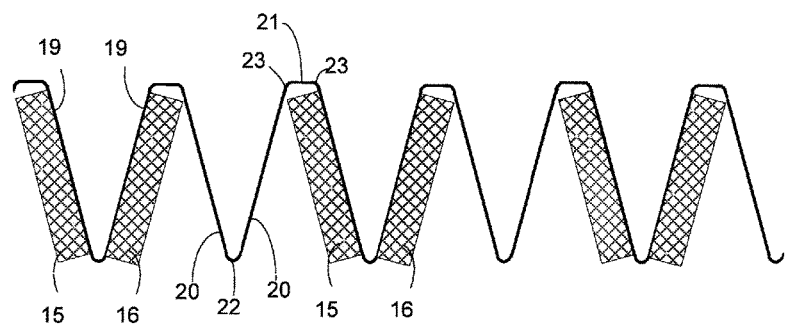
FIG. 9B shows the sheet FIG. 9A and a different stage of forming as viewed from the inlet in accordance with an embodiment.

Referring to FIG. 9B, a single sheet having flat sections 19, 20, and 21 is folded at locations 22 and 23 as shown. From flat sections 19, tabs are blanked and folded to form columns or elements 15 and 16, which are in form the same as those elements in all other drawings.

Figure 9C:
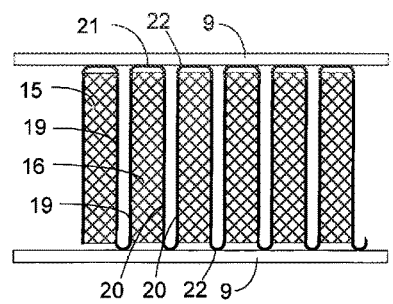
FIG. 9C shows the sheet of FIGS. 9A-9B in another configuration as viewed from the inlet in accordance with an embodiment.

Referring to FIG. 9C, the sheet of FIG. 9B is further folded to 180° bends at locations 22 and to 90° bends at locations 23. The formed sheet is disposed between two heat transfer surfaces 9.

FIG. 9A shows a view of a sheet from one face after blanking and forming of the tabs, not shown, in which the blanked shapes of flat sections 19, 20, and 21 can be seen in relation to fold lines 22 and 23. Instead of two flat sections 20 between consecutive flat sections 19, other numbers of flat sections 20 may be disposed between consecutive flat sections 19 to provide additional GSA, and the sheet could be coated with a suitable catalyst for use in a catalytic reactor, particularly a non-adiabatic catalytic reactor. Surfaces 9 may be straight or curved as viewed in FIG. 9C such that the one or more surfaces 9 are a tube wall. The catalytic reactor may be a steam methane reformer for converting a hydrocarbon and at least one of steam and carbon dioxide to a gas containing hydrogen.

Although the present invention has been described in terms of several embodiments, various features of separate embodiments can be combined to form additional embodiments not expressly described. Moreover, other embodiments within the scope of the present invention will be apparent to those skilled in the art. The only limitations on the scope of the invention are those expressly set forth in the claims which follow.

What is claimed is:

1. An apparatus providing enhanced heat transfer, the apparatus comprising:
   an inlet;
   an outlet;
   a plurality of distinct sheets disposed proximate respective portions of an inner surface of a tube having a length, each of the plurality of sheets being displaced and oriented in a respective sheet plane that is substantially parallel to the length of the tube; and
   a plurality of tabs attached to the plurality of sheets, the tabs lying in respective tab planes, wherein:
      each respective tab plane and a corresponding sheet plane intersect forming respective intersections;
      the tabs are tapered in width from the intersection and substantially bridge the gap between adjacent sheets from one end of the tab to the other;
      the intersections of the tab planes and the corresponding sheet planes are substantially parallel;
      the intersections of the tab planes and the corresponding sheet planes are at an angle of less than 88° to the length of the tube; and
      the plurality of tabs collectively form channels directing a fluid passing from the inlet to the outlet to impinge a heat transfer surface defined along the length of the tube.

2. The apparatus of claim 1 wherein the plurality of tabs are attached only to the sheets.

3. The apparatus of claim 1 wherein the plurality of tabs are formed by blanking and folding defined portions from the sheets.

4. The apparatus of claim 1 wherein the sheet planes are substantially perpendicular to a heat transfer surface defined along the length of the tube.

5. The apparatus of claim 1 wherein the tab planes are substantially parallel to each other.

6. the apparatus of claim 1 wherein angles between the intersections and a heat transfer surface defined along the length of the tube are less than 70°.

7. The apparatus of claim 1 wherein at least one of a tube wall and a plate define a heat transfer surface along the length of the tube.

8. The apparatus of claim 1 wherein at least one of the plurality of sheets and the plurality of tabs are coated with a catalyst.

9. The apparatus of claim 8 wherein the apparatus comprises a steam methane reformer.

10. The apparatus of claim 1 wherein each sheet plane is oriented at an angle with respect to a corresponding adjacent sheet plane.

* * * * *